US006677019B2

(12) United States Patent
Huffer

(10) Patent No.: US 6,677,019 B2
(45) Date of Patent: Jan. 13, 2004

(54) LIQUID-RESISTANT PAPERBOARD TUBE, AND METHOD AND APPARATUS FOR MAKING SAME

(75) Inventor: Scott W. Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 112 days.

(21) Appl. No.: 09/904,034

(22) Filed: Jul. 12, 2001

(65) Prior Publication Data

US 2003/0012897 A1 Jan. 16, 2003

(51) Int. Cl.[7] ......................... B29D 22/00; B29D 23/00; B32B 1/08; B65D 3/00; B65D 5/56

(52) U.S. Cl. .................. 428/36.91; 420/36.6; 420/36.7; 420/35.6; 420/452; 420/36.4; 420/308.8; 420/311.11; 420/311.71; 420/323; 420/331; 420/332; 229/4.5; 229/5.84

(58) Field of Search ............................ 428/36.9, 36.91, 428/36.92, 35.7, 36.6, 36.7, 35.6, 452, 36.4, 308.8, 311.11, 311.71, 323, 331, 332, 334, 335, 336; 229/4.5, 5.84

(56) References Cited

U.S. PATENT DOCUMENTS

| | | | | |
|---|---|---|---|---|
| 1,140,430 A | | 5/1915 | Woodward | |
| 1,268,030 A | | 5/1918 | McCoy | |
| 3,721,574 A | | 3/1973 | Schneider et al. | |
| 3,931,428 A | * | 1/1976 | Reick | 428/149 |
| 4,292,086 A | | 9/1981 | Clark et al. | |
| 4,563,231 A | * | 1/1986 | Porrmann et al. | 156/90 |
| 5,164,003 A | | 11/1992 | Bosco et al. | |
| 5,204,088 A | * | 4/1993 | Noebel et al. | 424/47 |
| 5,495,810 A | | 3/1996 | Yoshii | |
| 5,697,786 A | | 12/1997 | Lange-Mickel et al. | |
| 6,270,004 B1 | * | 8/2001 | Drummond et al. | 229/4.5 |

FOREIGN PATENT DOCUMENTS

| | | |
|---|---|---|
| JP | 57 107878 A | 7/1982 |
| JP | 61 252395 A | 11/1986 |
| JP | 63 101434 A | 5/1988 |

* cited by examiner

*Primary Examiner*—Harold Pyon
*Assistant Examiner*—Michael C. Miggins
(74) *Attorney, Agent, or Firm*—Alston & Bird LLP

(57) ABSTRACT

A paperboard tube is rendered resistant to liquid by coating portions or all of the tube with submicron-sized particles of inorganic material that are treated to be hydrophobic and/or oleophobic. The particles can be applied directly to the paperboard, lodging in surface pores such that the particles adhere to the paperboard. Alternatively, a light coating of a tacky binder or adhesive can first be applied to the paperboard and then the particles can be applied such that they adhere to the binder. Preferably, the particles have a large surface area per gram; in one embodiment, for instance, silica particles are employed having a surface area of about 90–130 $m^2/g$. As a result, the particles create a surface on the paperboard that is highly repellant to liquid.

5 Claims, No Drawings

LIQUID-RESISTANT PAPERBOARD TUBE, AND METHOD AND APPARATUS FOR MAKING SAME

FIELD OF THE INVENTION

The present invention relates to paperboard tubes, and more particularly relates to liquid-resistant paperboard tubes and to methods and devices for making such tubes.

BACKGROUND OF THE INVENTION

Paperboard tubes are widely used for various purposes. Such tubes are used, for example, as cores onto which paper, film, or textile webs are wound to form rolls. They are also used as containers for various types of products, as load-bearing structures, and as forms for making structures of concrete. Paperboard tubes can achieve great strength and are relatively inexpensive to manufacture. One difficulty associated with them, however, is that exposure of the paperboard to liquid can drastically impair the strength and even the integrity of the tubes. In some uses of paperboard tubes, the tubes may be required to withstand immersion in water or exposure to water-containing compositions for a substantial period of time without losing integrity. Accordingly, paperboard tubes that may be exposed to liquid during storage or use are often treated to make the tubes resistant to liquid. Waxes, silicones, and fluorinated coatings have been used on paperboard tubes for imparting some degree of liquid resistance. These types of treatments, however, typically do not adequately protect the tubes against complete immersion in water for prolonged periods of time.

SUMMARY OF THE INVENTION

The present invention addresses the above-noted needs and achieves other advantages, by providing a paperboard tube that is rendered resistant to liquid by coating portions or all of the tube with submicron-sized particles of inorganic material that are treated to be hydrophobic and/or oleophobic. The particles can be applied directly to the paperboard, lodging in surface pores such that the particles adhere to the paperboard. Alternatively, a light coating of a tacky binder or adhesive can first be applied to the paperboard and then the particles can be applied such that they adhere to the binder. Preferably, the particles have a large surface area per gram; in one embodiment, for instance, silica particles are employed having a surface area of about 90–130 $m^2/g$. As a result, the particles create a surface on the paperboard that is highly repellant to liquid.

The particles preferably are applied to the tube by passing the tube through a cloud of the particles with a high enough concentration that the particles completely coat the paperboard surfaces of the tube. Advantageously, the tube can be passed through an enclosure in which the cloud of particles is contained. If desired, the tube can be coated with a tacky binder prior to passing the tube through the enclosure. After the tube exits the enclosure, excess loose particles can be removed from the tube, such as by vacuum, and can be recycled back into the enclosure. The apparatus for treating the tube preferably is operable to maintain the concentration of particles inside the enclosure between predetermined minimum and maximum values.

In accordance with an alternative method of the invention, a liquid-resistant paperboard tube is made by applying a tacky binder to one side of a paperboard ply, wrapping a plurality of paperboard plies one upon another and adhering the plies together to form a tubular body wall, wrapping the paperboard ply having the tacky binder onto the tubular body wall and adhering the ply thereto such that the tacky binder is disposed on an outer surface of the tube, and applying submicron-sized particles of inorganic material to the tube such that the particles adhere to the tacky binder and form a liquid-resistant coating on the outer surface of the tube.

DETAILED DESCRIPTION OF PREFERRED EMBODIMENTS

The present invention now will be described more fully hereinafter with reference to preferred embodiments of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with the present invention, a paperboard tube is manufactured generally in a conventional fashion by spirally or convolutely wrapping a plurality of continuous strips or plies of paperboard around a forming mandrel and adhering the plies together with a suitable adhesive. A belt spirally advances the tube along the mandrel as the continuous plies are wrapped, so that a continuous paperboard tube is formed. The manufacture of such paperboard tubes is well known in the art and hence is not described in further detail herein.

Once a paperboard tube of the desired diameter is formed on the mandrel, the tube is typically advanced along the mandrel to a cutting device where it is cut into lengths appropriate for the intended application to which the tubes are to be put. In other cases, however, the continuously formed tube on the mandrel may be cut into lengths longer than required for the ultimate end use of the tube, and these longer tubes, sometimes called parent tubes, may subsequently be cut into shorter lengths.

The paperboard tubes may be treated in accordance with the invention to make them liquid-repellant either before or after cutting the tubes into the desired lengths for the end product. However, if the tube is treated and is then cut into shorter lengths, the cut end surfaces of the shorter tubes must then be treated to make them liquid-repellant.

The process for treating a paperboard tube to make it resistant to water in accordance with the invention entails applying to all exposed surfaces of the tube a coating of particles of an inorganic material that are treated to be hydrophobic. The particles advantageously are submicron-sized particles. The particles preferably comprise silica; submicron silica powder is commonly called fume silica, or silica fume, in the art. Examples of suitable hydrophobic fume silica that can be used with the invention are the Aerosil products R972, R972V, R974, R974V, and R976 available from Degussa Corporation. In a preferred embodiment, the fume silica has an average particle size of about 16 mn.

The coating of particles on the surfaces of the paperboard tube can be thin. For example, a coating of about 3 to 4 mils thickness is adequate to render the tube repellant to liquid water.

If desired, the coating of particles can be adhered to the paperboard surfaces by first applying a light coating of a tacky adhesive, and then applying the particles. It is believed that a tube treated in this manner may be most robust and able to withstand complete immersion in water, compared to a tube that does not include the tacky adhesive.

In some applications, however, it may be sufficient to apply the coating of particles directly to the paperboard surfaces of the tube. Because paperboard on a microscopic level has a very rough surface with many pores, the submicron-sized particles can lodge in the surface and be retained there. Thus, it may be possible to omit the tacky adhesive.

In accordance with one preferred embodiment of the invention, a paperboard tube is treated to be water-resistant by passing the tube through an enclosure or chamber in which a cloud of airborne fume silica particles is present. The concentration of particles in the chamber can be regulated by a suitable system so that there are sufficient particles to achieve the desired thickness of coating on the tube. For example, a sensor (e.g., an optical sensor or the like) can be used to detect the concentration of airborne particles, and a device for feeding particles into the chamber can be regulated in a feedback loop based on the signal from the sensor.

The chamber preferably includes an inlet through which the tube is passed into the chamber, and an outlet from which the tube exits the chamber. Suitable seals are used at the inlet and exit to prevent particles from escaping. Once the treated tube exits the chamber, excess loose particles can be removed from the tube, such as by vacuum, and can be recirculated back into the chamber, if desired. The chamber preferably is connected to a circulation system that continually scavenges particles from the chamber and feeds new particles into the chamber, so that continuous air movement keeps the particles airborne inside the chamber.

If a tube treated in this manner is subsequently cut into shorter lengths, the cut ends of the tubes must then be coated with the particles to render the ends water-resistant. Various methods can be used for applying the particles on the cut ends. For instance, a closed bag containing fume silica powder can be provided. The bag can be formed of a porous material that allows particles to escape through the material, similar to a rosin bag. The bag of fume silica can be patted against the cut end of a tube to coat the cut end with particles. Alternatively, the cut end of the tube can be inserted into a container of fume silica and agitated against the powdered fume silica.

Other methods can be used for applying the coating of particles on the surfaces of the paperboard tube. The invention thus is not limited to any particular method for applying the particles.

The invention has been described with reference to a water-resistant tube treated with hydrophobic particles. However, it will be appreciated that an oil-resistant tube can be provided in an analogous manner by coating the tube with particles that are treated to be oleophobic.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A liquid-resistant paperboard tube, comprising:

a body wall formed of one to a plurality of paperboard plies wrapped into a tubular shape and adhered together; and a liquid-resistant coating of submicron-sized particles of inorganic material covering at least a portion of the body wall, the particles are repellant to liquid, wherein the particles are attached directly to paperboard surfaces of the body wall and are lodged surface pores of the paperboard surfaces, wherein the coating of submicron-sized particles is free of adhesive or binder.

2. The liquid-resistant paperboard tube of claim 1, wherein the particles comprise silica.

3. The liquid-resistant paperboard tube of claim 2, wherein the particles have an average diameter of about 16 nm.

4. The liquid-resistant paperboard tube of claim 1, wherein the body wall comprises a plurality of paperboard plies wrapped one upon another and adhesively joined together.

5. The liquid-resistant paperboard tube of claim 4, wherein the paperboard plies are helically wrapped about an axis of the body wall.

* * * * *